(12) United States Patent
Yabe

(10) Patent No.: US 9,092,809 B2
(45) Date of Patent: Jul. 28, 2015

(54) SALES SYSTEM AND SALES MANAGEMENT METHOD

(75) Inventor: Yuhei Yabe, Tokyo (JP)

(73) Assignees: SONY CORPORATION, Tokyo (JP); SONY COMPUTER ENTERTAINMENT INC., Tokyo (JP)

( * ) Notice: Subject to any disclaimer, the term of this patent is extended or adjusted under 35 U.S.C. 154(b) by 752 days.

(21) Appl. No.: 12/990,979

(22) PCT Filed: May 19, 2010

(86) PCT No.: PCT/JP2010/003359
§ 371 (c)(1),
(2), (4) Date: Sep. 8, 2011

(87) PCT Pub. No.: WO2011/045874
PCT Pub. Date: Apr. 21, 2011

(65) Prior Publication Data
US 2011/0313886 A1 Dec. 22, 2011

(30) Foreign Application Priority Data
Oct. 13, 2009 (JP) ................................. 2009-236401

(51) Int. Cl.
*G06Q 30/00* (2012.01)
*G06Q 30/06* (2012.01)
*G06F 21/10* (2013.01)

(52) U.S. Cl.
CPC .............. *G06Q 30/06* (2013.01); *G06F 21/10* (2013.01); *G06Q 30/0617* (2013.01)

(58) Field of Classification Search
CPC ................................ G06F 21/10; G06Q 30/06
USPC ............................................ 705/26.1, 51, 59
See application file for complete search history.

(56) References Cited

U.S. PATENT DOCUMENTS 7,039,615 B1 5/2006 Gajjala et al.
7,818,811 B2 * 10/2010 Kirovski et al. ................ 726/26
(Continued)

FOREIGN PATENT DOCUMENTS

JP 2002-279103 A * 9/2002
JP 2003-44689 2/2003
(Continued)

OTHER PUBLICATIONS

Anon., "Yummy Interactive to Offer GameShield Free of Cost," Business Wire, Mar. 23, 2009.*
(Continued)

*Primary Examiner* — Nicholas D Rosen
(74) *Attorney, Agent, or Firm* — Katten Muchin Rosenman LLP

(57) ABSTRACT

A sales system according to an embodiment includes a sales management device and a license management device. When a recording medium on which a digital content is recorded has been sold from a final seller to an end user through the distribution channel of the recording medium, the sales management device communicates the sales information to the license management device. On condition that the sales information has been communicated from the sales management device, the license management device provides a license for enabling the use of the digital content to the user terminal. When the recording medium has been sold to the end user, the sales management device supports transferring part of the sales price of the recording medium to the intermediate seller involving the distribution of the recording medium.

5 Claims, 7 Drawing Sheets

(56) References Cited

U.S. PATENT DOCUMENTS

| | | | |
|---|---|---|---|
| 8,117,130 B2* | 2/2012 | Aydar et al. | 705/59 |
| 8,839,005 B2* | 9/2014 | Elazar et al. | 713/194 |
| 2002/0116283 A1* | 8/2002 | Chatani | 705/26 |
| 2003/0004895 A1* | 1/2003 | Nuttall et al. | 705/67 |
| 2005/0289081 A1* | 12/2005 | Sporny | 705/64 |
| 2006/0167803 A1* | 7/2006 | Aydar et al. | 705/51 |
| 2007/0038577 A1* | 2/2007 | Werner et al. | 705/59 |
| 2007/0136608 A1* | 6/2007 | Kirovski et al. | 713/193 |
| 2007/0294100 A1* | 12/2007 | Chen et al. | 705/1 |
| 2008/0065911 A1* | 3/2008 | Elazar et al. | 713/194 |

FOREIGN PATENT DOCUMENTS

| | | |
|---|---|---|
| JP | 2003-150265 | 5/2003 |
| JP | 2003-178162 | 6/2003 |
| JP | 2003-228771 | 8/2003 |
| JP | 2007-58322 | 3/2007 |
| WO | WO-01/84282 A2 * | 11/2001 |

OTHER PUBLICATIONS

Machine Translation of Japanese Patent Application Publication 2003-150265-A, translation dated Feb. 27, 2014.*

Machine Translation of Japanese Patent Application Publication 2003-178162-A, translation dated Feb. 27, 2014.*

Machine Translation of Japanese Patent Application Publication 2007-058322-A, translation dated Feb. 27, 2014.*

Translation of International Preliminary Report on Patentability & Written Opinion of the International Searching Authority dated May 15, 2012, from corresponding International Application No. PCT/JP2010/003359.

Chinese First Office Action dated Jan. 18, 2013, from corresponding Chinese Application No. 201080001942.1.

International Search Report dated Jun. 15, 2010, from the corresponding International Application.

Written Opinion of the International Searching Authority dated Jun. 15, 2010, from the corresponding International Application.

Notification of Reason(s) for Refusal dated Jun. 15, 2010, from the corresponding Japanese Application.

Decision of Refusal dated Oct. 19, 2010, from the corresponding Japanese Application.

European Search Report dated Oct. 10, 2014 from corresponding Application No. 10816401.3.

* cited by examiner

| ITEM ID | ROYALTY AMOUNT | PURCHASE PRICE |
|---------|----------------|----------------|
| 0001    | 500 YEN        | 3000 YEN       |
| ⋮       | ⋮              | ⋮              |

32

| OPEN ID | SECRET ID | LICENSE FLAG | ITEM ID | SALES DATE | RETAILER ID |

54

| ITEM ID | SALES DATE | RETAILER ID | USER ID |

56

SALES SYSTEM AND SALES MANAGEMENT METHOD

TECHNICAL FIELD

The present invention relates to a data processing technique, in particular, to a technique for managing sales of recording media on which digital contents are recorded.

BACKGROUND TECHNOLOGY

Recently, data exchanges among a plurality of information processing devices have been widely carried out through communication networks. In the following Patent Document 1, a cash register is proposed by which downloading or uploading a digital content can be carried out and sales of a fee for the downloading or uploading can be registered.
[Patent Document 1] Japanese Patent Application Publication No. 2003-228771

DISCLOSURE OF THE INVENTION

Problem to be Solved by the Invention

Even at present, there are many cases where recording media on which digital contents are recorded are sold to end users at the stores of the final sellers in the distribution channels of recording media, as a form of selling digital contents. Upon purchasing recording media from the intermediate sellers, the final sellers are so far required to pay to the intermediate sellers the purchase prices of the recording media, and accordingly there occurs a state in which the cash flows of the final sellers are decreased by the purchase prices thereof before the recording media are sold to end users. Therefore, the present inventor has considered that the final sellers have significant risks in a series of transactions from manufacture of recording media through sales thereof.

The present invention has been made based on the aforementioned idea of the present inventor, and a main purpose of the invention is to provide a technique for reducing business risks in the final sellers who sell recording media on which digital contents are recorded to end users.

Means for Solving the Problem

In order to solve the aforementioned problem, a sales system according to an embodiment of the present invention comprises a sales management device and a license management device. The sales management device includes a sales information communication unit configured to communicate, when a recording medium on which a digital content is recorded has been sold from a final seller to an end user through a distribution channel of the recording media, to the license management device the sales information indicating that the recording medium has been sold. The license management device includes a license provision unit configured to provide, on condition that the sales information has been communicated from the sales management device, a license for enabling the use of the digital content to the end user. The sales management device further includes a money transfer support unit configured to support transferring part of the sales price to an intermediate seller involving the distribution of the recording medium when the recording medium has been sold to the end user.

Another embodiment of the present invention is a sales management method. The method is executed by the sales management device and comprises executing payment of the purchase price of a recording medium on which a digital content is recorded to the intermediate seller involving the distribution of the recording medium when the recording medium has been sold to an end user, by supporting transferring part of the sales price to the intermediate seller when the recording medium has been sold from a final seller to the end user through the distribution channel of the recording medium.

It is noted that any combination of the aforementioned components or any manifestation of the present invention exchanged between devices, methods, systems, programs, recording media on which programs are stored, and so forth, is also effective as an embodiment of the present invention.

Advantage of the Invention

According to the present invention, business risks in the final sellers who sell recording media on which digital contents are recorded to end users can be reduced.

REFERENCE NUMERALS

10 SALES MANAGEMENT DEVICE
12 LICENSE MANAGEMENT DEVICE
14 RETAILER DEVICE
16 USER TERMINAL
18 ACCOUNT TRANSFER DEVICE
32 PAYMENT AMOUNT HOLDER
36 SALES INFORMATION TRANSFER UNIT
38 MONEY TRANSFER SUPPORT UNIT
40 PRICE COMMUNICATION UNIT
54 KEY HOLDER
56 SALES SITUATION HOLDER
60 SALES INFORMATION RECEIVING UNIT
62 AVAILABILITY PROCESSING UNIT
64 LICENSE REQUEST RECEIVING UNIT
66 LICENSE PROVISION UNIT
68 SALES SITUATION RECORDING UNIT
100 SALES SYSTEM

BEST MODE FOR CARRYING OUT THE INVENTION

Prior to the description of the configurations according to an embodiment of the present invention, the outline thereof will be first described. The digital content according to the present embodiment is assumed to be a game application, and a recording medium on which the digital content is recorded is to be an optical disk. Hereinafter, an optical disk on which a game application is recorded is also referred to as a "game disk".

Figure 1:
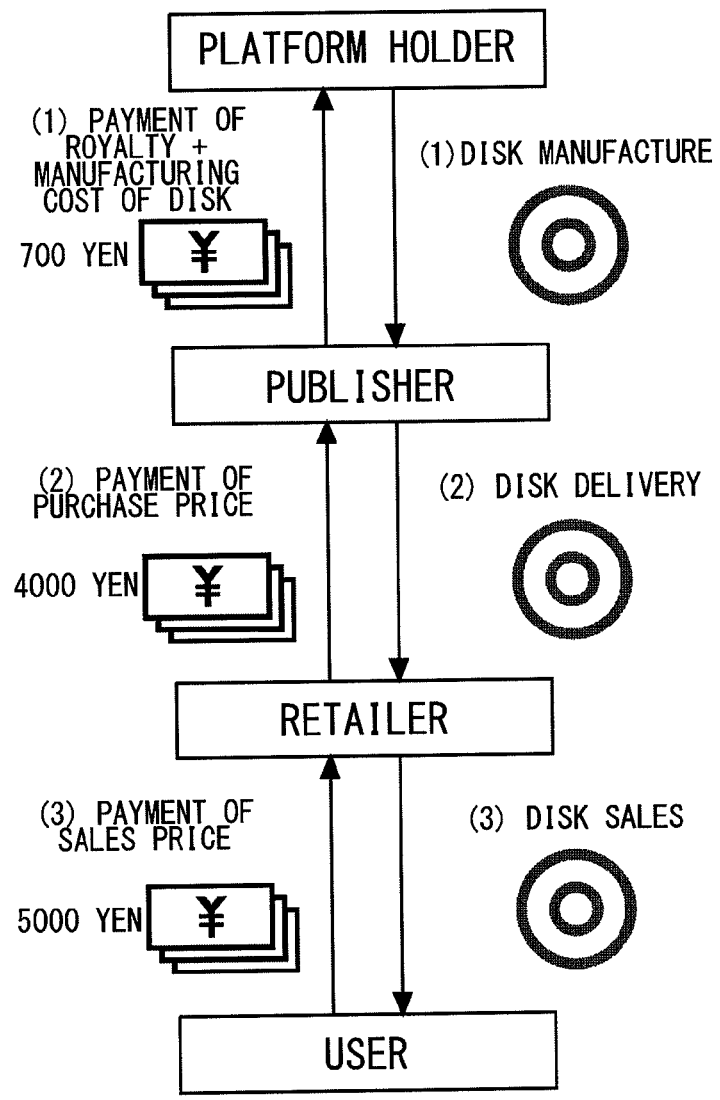
FIG. 1 is a view illustrating a form of transaction in the conventional sales of game disks.

FIG. 1 illustrates a form of transaction in the conventional sales of game disks. A platform holder in the view is at an owner-like position for the game disks where he/she manufactures game disks, whereas a publisher sells the game disks by wholesale. The platform holder and the publisher are intermediate sellers intervening in the distribution of the game disks. A retailer is a final seller who sells the game disk to a user by retail. The user is an end user of the game disk who loads the game disks into his/her own terminal to enjoy the game application.

In a series of transaction processes of game disks, the distribution of the game disks themselves and the commercial distribution thereof, payments of the counter values for the distribution, have been conventionally the same as each other. For example, the royalty and the manufacturing cost of a game disk have been paid as the counter value for the transfer of the game disk between the platform holder and the publisher. Also, the purchase price of the game disk has been paid as the counter value for the transfer of the game disk between the publisher and the retailer. Also, the sales price of the game disk has been paid as the counter value for the transfer of the game disk between the retailer and the user.

Generally, the purchase price to be paid from the retailer to the publisher is approximately 70 to 80 percent of the sales price to be paid from the user to the retailer. The retailer needs to purchase the game disk from the publisher in order to sell it, which involves payment the purchase price. However, the retailer receives the income of the sales price when the game disk has been sold to the user. Accordingly, there is the risk to the retailer that his/her cash flow may be short. In addition, there is also a theft risk in which the retailer cannot retrieve money for the purchase price if the game disk is stolen.

Because the retailer has significant risks as stated above, he/she has sometimes suppressed a purchase amount of the game disks to reduce the risks. This has incurred the opportunity loss of selling the game disks. Also, this has caused the retailers dealing in used game disks, the margins of which are high, to be increased in number. In the transactions of the used game disks, the platform holders and the publishers cannot receive any income at all. Accordingly, it can be said that a situation where the retailer has significant risks is not preferred also to the platform holder and the publisher.

Figure 2:
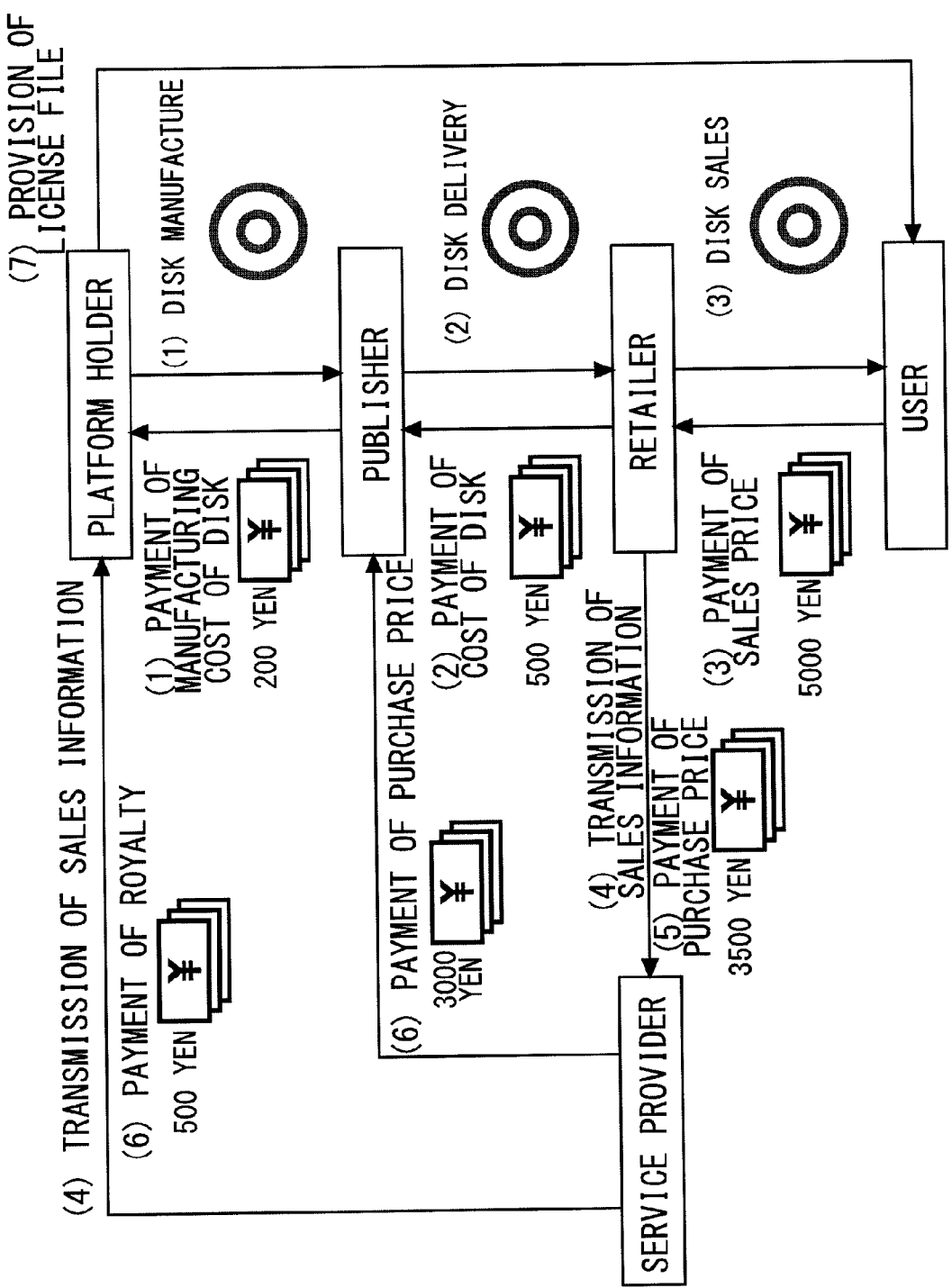
FIG. 2 is a view illustrating a form of transaction proposed in the present embodiment.

FIG. 2 illustrates a form of transaction proposed in the present embodiment. A new player called a service provider, intervening in the commercial distributions between the platform holder and the publisher and between the publisher and the retailer, appears in the transaction process of the game disks according to the present embodiment. Thereby, a super-distribution-like form of transaction is created in which the distribution of the game disks and the commercial distribution of the counter values for the distribution are partially separated from each other.

In the form of transaction in FIG. 2, when the game disk is transferred between the platform holder and the publisher or between the publisher and the retailer, it is needed only to pay the cost price of the game disk. When the game disk has been sold at the retailer, the royalty and the remaining amount of money of the purchase price will be paid by the service provider. In other words, in a series of the transaction processes of the game disks, intermediate margins, which have been serially paid so far, are paid at a time when the game disk has been sold.

According to the form of transaction in FIG. 2, the money to be paid when the retailer purchases the game disk, is greatly reduced compared to the conventional form thereof, thereby allowing for the risks of the retailer in terms of cash flow to be reduced when the retailer has a stock of the game disks. In other words, the risks the retailer has so far are allocated also to the platform holder and the publisher. However, because the cost prices have already been paid, it can be said that the timings when the platform holder and the publisher enjoy the profits are synchronized with when the game disk has been sold, i.e., with the retailer.

The sales information indicating that the game disk has been sold at the retailer is communicated to the platform holder through the service provider. On condition that the sales information has been accepted, the platform holder provides a license file for enabling the use of the game application to the user. Thereby, in a stolen game disk without being bought, the game application thereof cannot be used, and hence a risk of being stolen can be reduced. Hereinafter, a system configuration for achieving the form of transaction in FIG. 2 will be described.

Figure 3:
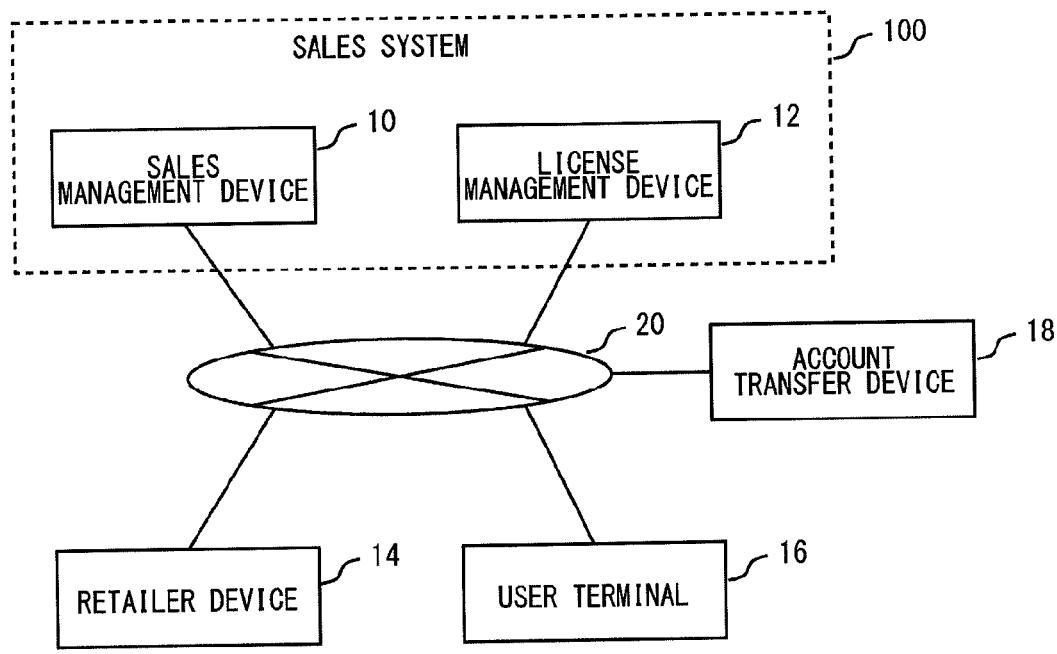
FIG. 3 is a view illustrating the configuration of a sales system according to an embodiment of the present invention.

FIG. 3 illustrates the configuration of a sales system 100 according to an embodiment of the present invention. The sales system 100 comprises a sales management device 10 and a license management device 12 that are connected with each other through a communication network 20 including known communication means, such as a LAN, a WAN, and the Internet. The sales system 100 is connected with a retailer device 14, a user terminal 16, and an account transfer device 18 through the communication network 20.

The account transfer device 18 is an information processing device installed in a financial institution to receive an account transfer request and execute the processing of transferring the amount of money, designated by the account transfer request, from the payer's account to the payee's account that are also designated by the account transfer request. The user terminal 16 is an information processing terminal operated by the user in FIG. 2, and is used for loading a game disk to execute the game application. It is needed to acquire the license file for the use of a game application. Accordingly, the user terminal 16 transmits to the license management device 12 the data for requesting acquisition of the license (hereinafter, also referred to as a "license acquisition request").

The retailer device 14 is an information processing device installed in the retailer in FIG. 2 to manage the sales of the game disks there. Specifically, the retailer device 14 transmits to the sales management device 10 the sales information indicating that the game disk has been sold at the retailer. The retailer device 14 also manages the sales price of the game disk at the retailer. When a change in the royalty amount or the purchase price is communicated from the sales management device 10, the retailer device 14 adjusts the sales price of the game disk in accordance with the change situation.

The sales management device 10 is an information processing device installed in the service provider in FIG. 2 to transmit the sales information, accepted from the retailer device 14, to the license management device 12. Along with it, the sales management device 10 transmits at least part of the sales price at the retailer to the platform holder and the publisher. The detailed configuration of the sales management device 10 will be described later.

The license management device 12 is an information processing device installed in the platform holder in FIG. 2 to provide the license file of the game application to the user terminal 16. The detailed configuration of the license management device 12 will be described later.

Figure 4:
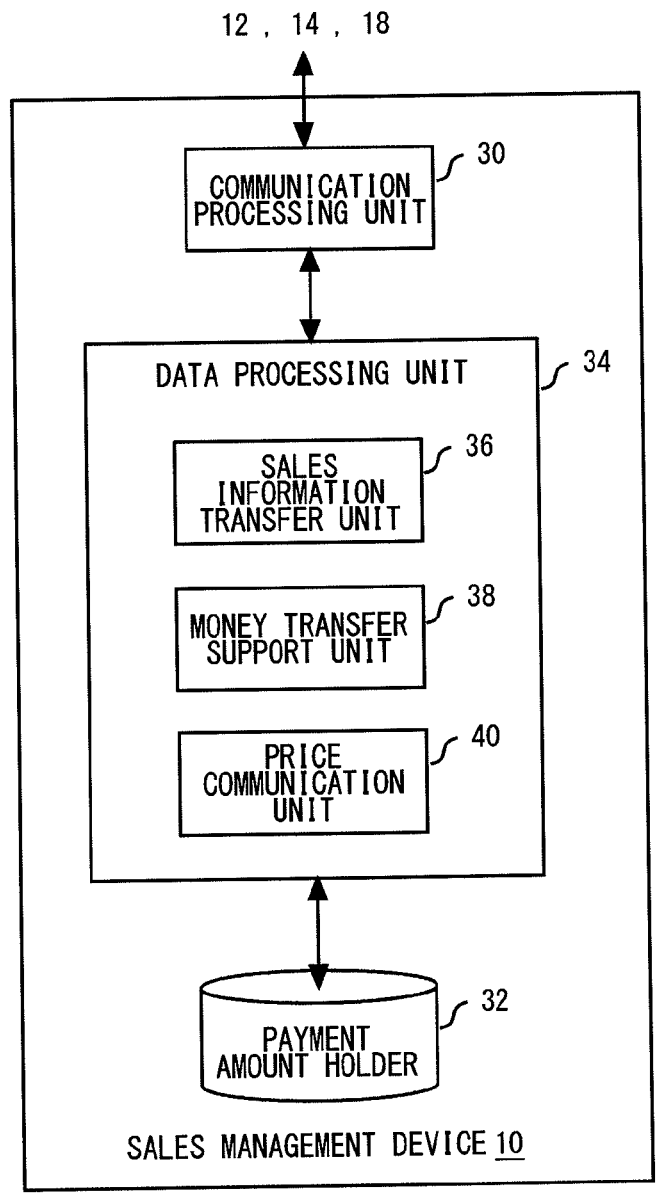
FIG. 4 is a block view illustrating the functional configuration of the sales management device in FIG. 3.

FIG. 4 is a block view illustrating the functional configuration of the sales management device 10 in FIG. 3. The sales management device 10 includes a communication processing unit 30, a payment amount holder 32, and a data processing unit 34.

Each block illustrated in the block views of the present description can be realized with elements or devices including a CPU and a memory of a computer in terms of hardware, and realized with a computer program, etc., in terms of software; however, functional blocks realized by cooperation of these are illustrated herein. Accordingly, it will be understood by a person skilled in the art that these functional blocks can be realized in various forms according to combinations of hardware and software. For example, each functional block in FIG. 4 may be installed on the hard disk of the sales management device 10 as software such that each the functional block is appropriately readout onto the memory thereof to be executed by the processor. The same is true with other block views described later.

The communication processing unit 30 executes, through the communication network 20, communication processing with external devices, such as the license management device 12, the retailer device 14, and the account transfer device 18, etc. The data processing unit 34, which will be described later, sends/receives various data to/from the external devices through the communication processing unit 30.

Figures 5, 6:
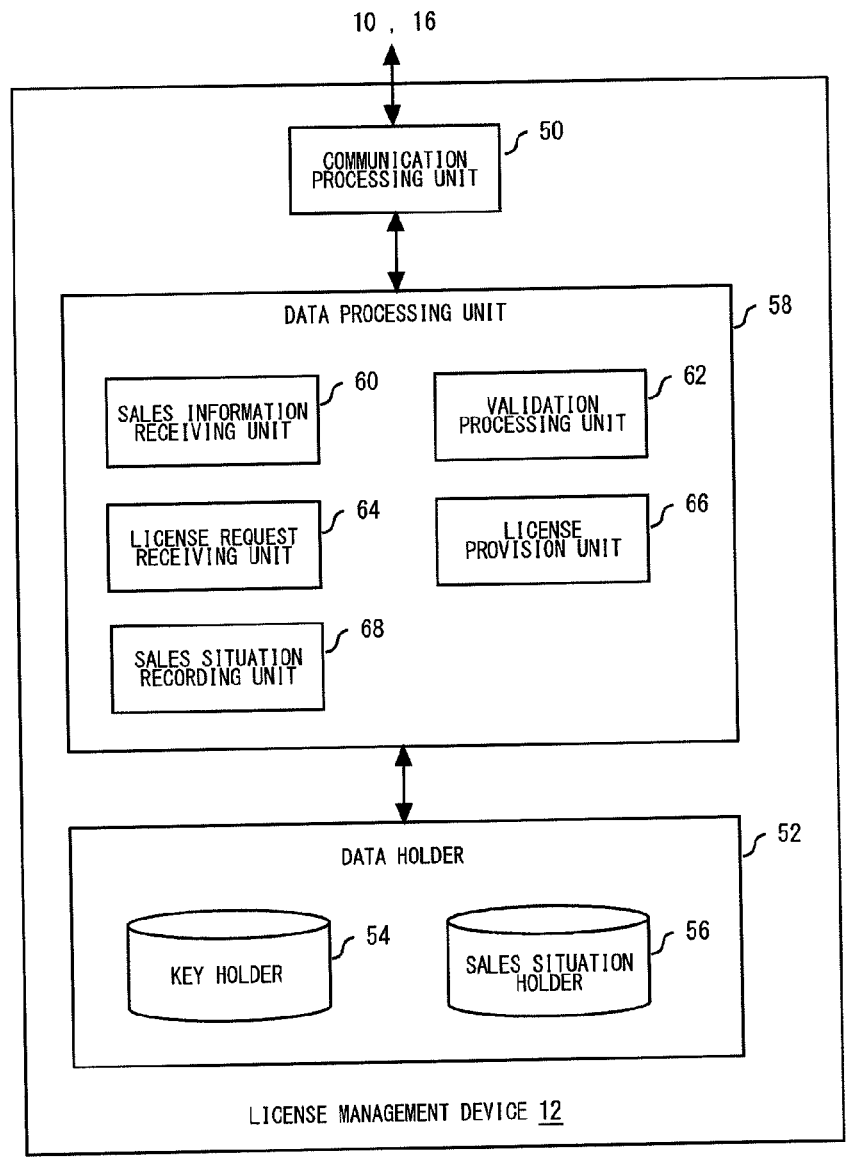
FIG. 5 is a view illustrating the structure of payment amount information held in a payment amount holder.
FIG. 6 is a block view illustrating the functional configuration of the license management device in FIG. 3.

The payment amount holder 32 is a storage area in which the payment amount information is held, the payment amount information indicating the amount of money to be transferred from the account of the retailer to those of the platform holder and the publisher when the game disk has been sold at the retailer. FIG. 5 illustrates the structure of the payment amount information held in the payment amount holder 32. In the item ID column, an ID for identifying the type of the game disk to be sold at the retailer, for example, a game title, is set. In the royalty amount column, the royalty amount to be paid from the service provider to the platform holder is set. In the purchase price column, the purchase price to be paid from the service provider to the publisher is set.

Referring back to FIG. 4, the data processing unit 34 executes various data processing in the service provider. The data processing unit 34 has a sales information transfer unit 36, a money transfer support unit 38, and a price communication unit 40.

When receiving the sales information from the retailer device 14, the sales information transfer unit 36 transmits the sales information to the license management device 12. The sales information includes the item ID, sales date, the retailer ID for identifying the retailer who has sold the game disk, and the open ID that has been set in the sold game disk in advance and has been disclosed. The open ID may be printed on the surface of the package of the game disk, that is, printed in an identifiable manner when the game package is purchased. Alternatively, the open ID may be inputted into the retailer device 14 by a salesperson at the retailer who has sold the game disk.

The money transfer support unit 38 executes processing for supporting transferring the royalty amount to the platform holder and the purchase price to the publisher, referring to the payment amount information. Specifically, the money transfer support unit 38 transmits, to the account transfer device 18, account transfer request data in which the account of the retailer is designated as the payer's account, the account of the platform holder is as the payee's account, and the royalty amount is as the transfer amount of money. Along with it, the money transfer support unit 38 transmits, to the account transfer device 18, account transfer request data in which the account of the retailer is designated as the payer's account, the account of the publisher is as the payee's account, and the purchase price is as the transfer amount of money.

When detecting that the payment amount information in the payment amount holder 32 has been changed, the price communication unit 40 communicates, to the retailer device 14, data indicating the content of the change. Thereby, the price communication unit 40 makes the sales price of the game disk adjusted in the retailer device 14. For example, when the purchase price in the payment amount information is lowered from 3,000 yen to 1,500 yen, the price communication unit 40 may make the sales price of the game disk lowered from 5,000 yen to 3,500 yen by communicating the drop in the purchase price to the retailer device 14.

FIG. 6 is a block view illustrating the functional configuration of the license management device 12 in FIG. 3. The license management device 12 has a communication processing unit 50, a data holder 52, and a data processing unit 58. The communication processing unit 50 executes communication processing with external devices, such as the sales management device 10, and the user terminal 16, etc., through the communication network 20. The data processing unit 58, which will be described later, sends/receives various data to/from the external devices through the communication processing unit 50.

The data holder 52 is a storage area in which various data are stored, and has a key holder 54 and a sales situation holder 56. The key holder 54 holds key information in which the open ID and secret ID of the game disk manufactured by the platform holder are associated with each other, the secret ID being used for identifying the game disk and not being disclosed.

Figures 7, 8, 9:
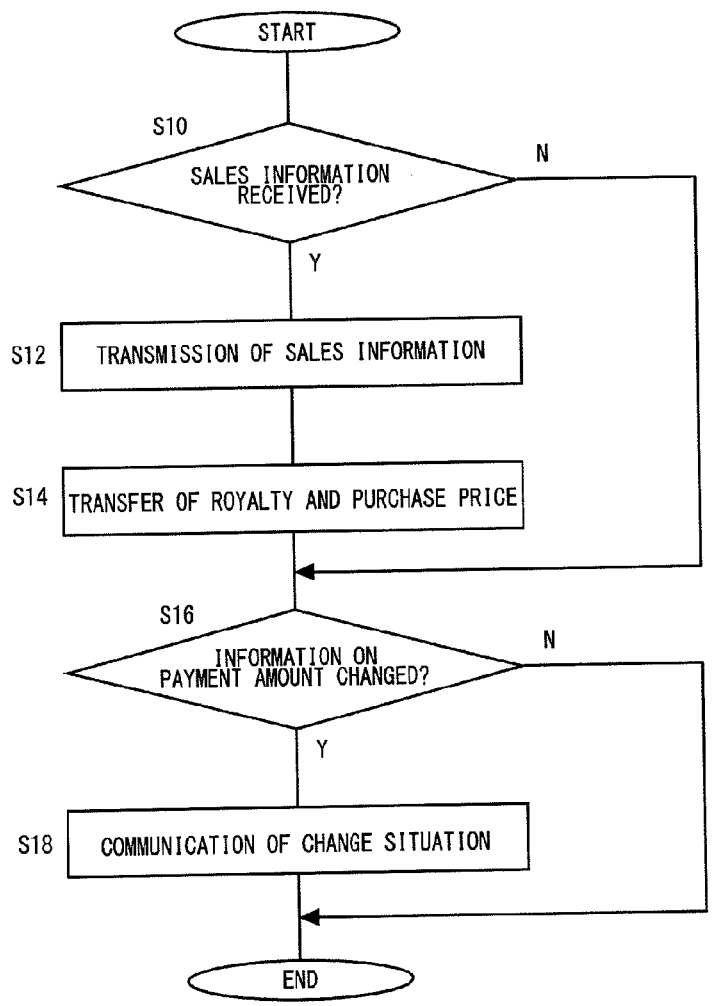
FIG. 7 is a view illustrating the structure of key information held in a key holder.
FIG. 8 is a view illustrating the structure of the sales situation data held in a sales situation holder.
FIG. 9 is a flowchart illustrating the operations of the sales management device.

FIG. 7 illustrates the structure of the key information held in the key holder 54. In the license flag column, a flag indicating whether the secret ID is available, i.e., whether the license file can be provided in response to a license acquisition request in which the secret ID is designated, is set. In the item ID column, the sales date column, and the retailer ID column, the same information as the sales information are set. In the open ID and the secret ID of the key information, IDs for uniquely specifying the game disk are set when the game disk is shipped from the platform holder to the publisher. The license flag through the retailer ID are set when the sales information has been received in the license management device 12. In the license flag in the initial state, an unavailable flag indicating that the secret ID is unavailable is set.

The sales situation holder 56 holds sales situation data in which the information on the retailer who has sold the game disk and that on the user who has bought it are associated with each other. FIG. 8 illustrates the structure of the sales situation data held in the sales situation holder 56. The same information as the sales information are set in the item ID column, the sales date column, and the retailer ID column. In the user ID column, an ID for identifying the user who has bought the game disk is set. The user ID may be a log-in ID with which the user logs in the site of the platform holder providing the license file.

Referring back to FIG. 6, the data processing unit 58 executes various data processing in the platform holder. The data processing unit 58 has a sales information receiving unit 60, an availability processing unit 62, a license request receiving unit 64, a license provision unit 66, and a sales situation recording unit 68.

The sales information receiving unit 60 receives the sales information transmitted from the sales management device 10. The availability processing unit 62 specifies the record of the key information in which the open ID, included in the sales information, is set, so that an available flag indicating that the secret ID is available is set in the license flag column of the key information. Further, the data of the item ID, the sales date, and the retailer ID, which are included in the sale information, are set in the aforementioned specified record.

The license request receiving unit 64 receives a license acquisition request transmitted from the user terminal 16. The license acquisition request includes the secret ID of the game disk and the user ID. The secret ID is an ID that is identifiable only by the user who has bought the game disk. The secret ID may be printed on the inside surface of the package of the game disk, that is, printed in a manner in which the secret ID cannot be identified before the package is unpacked, or inputted into the user terminal 16 by the user. Alternatively, the secret ID may be set in the recorded data of the game disk in advance such that the user terminal 16 reads the secret ID from the game disk.

The license provision unit 66 specifies the record of the key information in which the secret ID, included in the license acquisition request, is set, so that it is determined whether an available flag is set in the license flag column of the key information. When an available flag is set, the license file for the game application is transmitted to the user terminal 16. When an unavailable flag is set, provision of the license file is refused.

When the license file is transmitted to the user terminal 16, the sales situation recording unit 68 associates the item ID and the sales date, which are stored in the key information, with the user ID designated in the license acquisition request to store these data in the sales situation holder 56 as sales situation data. Although not illustrated in FIG. 6, the license management device 12 may further comprise a sales situation output unit. The sales situation output unit may output the sales situation data, in which the user who has bought the game disk and the retail store are associated with each other, into a predetermined output device, such as a display, etc., as the data for supporting marketing activities. Alternatively, the sales situation output unit may generate and output data using a predetermined form for supporting marketing activities, in accordance with the attribute information on users and retail stores, which are stored in a non-illustrated data-base.

Operations of the devices having the aforementioned configurations will be described below. FIG. 9 is a flowchart illustrating the operations of the sales management device 10. When receiving the sales information from the retailer device 14 (S10/Y), the sales information transfer unit 36 transfers the sales information to the license management device 12 (S12). The money transfer support unit 38 returns part of the sales price at the retailer to the platform holder and the publisher by transferring the royalty to the platform holder and the purchase price to the publisher (S14). If not receiving the sales information (S10/N), S12 and S14 are skipped. When the information on the payment amount, such as the royalty amount or the purchase price, etc., has been changed (S16/Y), the price communication unit 40 makes the sales price at the retailer adjusted by communicating the change situation to the retailer device 14 (S18). When there is no change in the information on the payment amount (S16/N), S18 is skipped to end the flow of this view.

Figure 10:
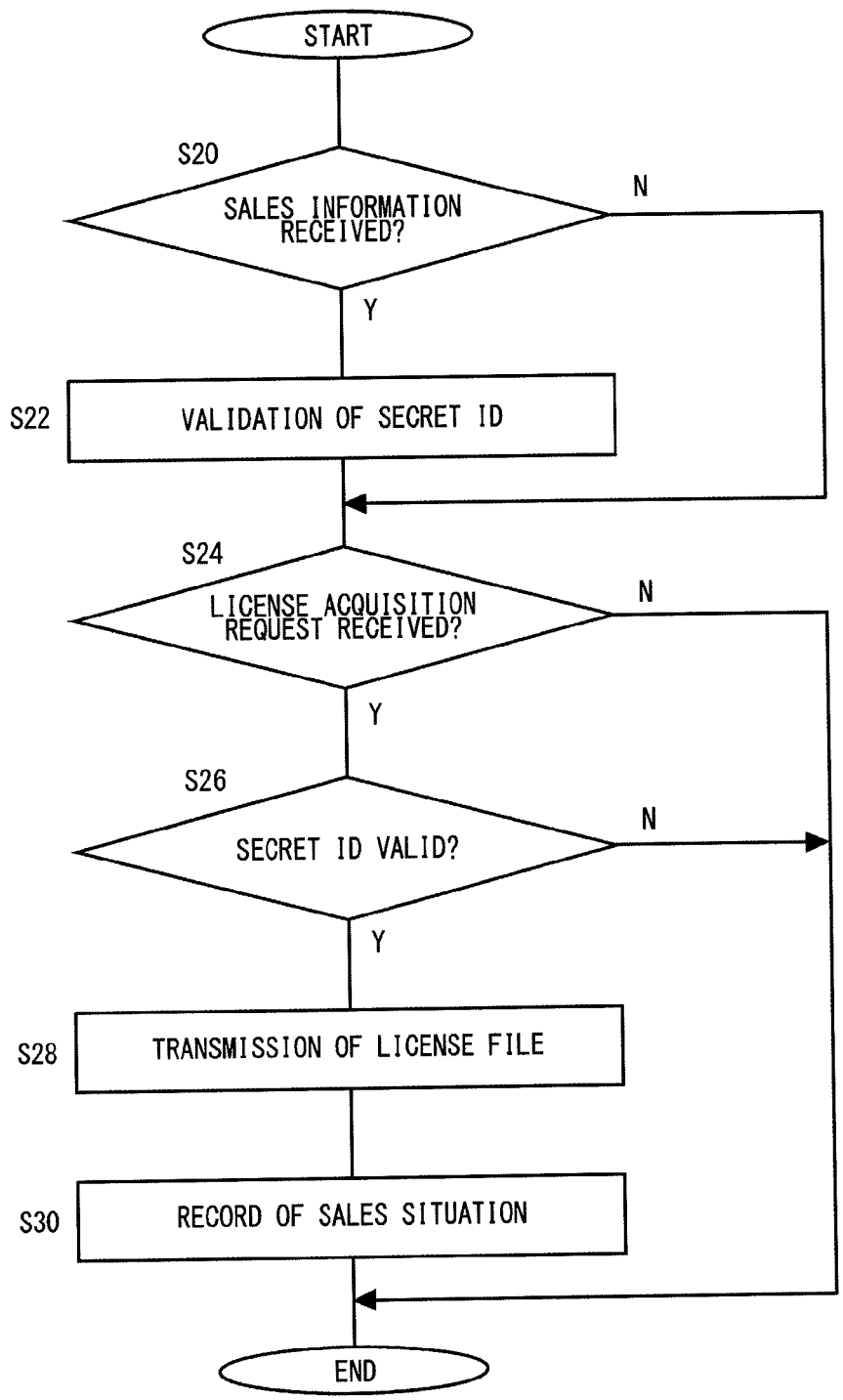
FIG. 10 is a flowchart illustrating the operations of the license management device.

FIG. 10 is a flowchart illustrating the operations of the license management device 12. When the sales information receiving unit 60 has received the sales information from the sales management device 10 (S20/Y), the availability processing unit 62 makes the secret ID, associated with the open ID included in the sales information, available (S22). If not receiving the sales information (S20/N), S22 is skipped. When the license request receiving unit 64 has received a license acquisition request from the user terminal 16 (S24/Y) and when the secret ID is made available (S26/Y), the license provision unit 66 transmits the license file to the user terminal 16 (S28). Along with it, the sales situation recording unit 68 stores, into the sales situation holder 56, sales situation data in which the user who has bought the game disk and the retailer who has sold it are associated with each other (S30). When the secret ID is not made available (S26/N), S28 and S30 are skipped to end the flow of this view. When a license acquisition request is not received (S24/N), S26 through S30 are skipped to end the flow of this view.

According to the sales system 100 of the present embodiment, the superdistribution-like transaction illustrated in FIG. 2 is achieved. That is, the payment amount to be paid to the publisher, occurring when the retailer purchases the game disk, is reduced, thereby allowing for the business risks of the retailer to be reduced. Further, because it is determined by the cooperation of the open ID and the secret ID whether provision of the license file is permitted, and because the game application is not available in a stolen game disk, the risk of the game disk being stolen at the retailer can also be reduced. Because the business risks of the retailer are reduced as stated above, it becomes easy that the retailer purchases more game disks than ever to sell them. Further, because it becomes easy that the retailer deals with brand-new game disks, it can be expected that the amount of the brand-new disks to be dealt with may be increased, thereby bringing merits also to the platform holder and the publisher.

Also, according to the sales system 100, the sales price at the retailer is changed in connection with the change in the royalty amount or the purchase price. Because a large amount of purchase expenses has been needed in the conventional forms of transactions, it is difficult to make the sales price at the retailer follow the change in the royalty amount or the purchase price, if any. In the present embodiment, however, the expenses necessary for the purchase of game disks are reduced, and hence it becomes possible to flexibly adjust the sales price in accordance with the change in the royalty amount or the purchase price. When the change in the royalty amount or the purchase price is communicated from the sales management device 10, the retailer device 14 may instantly change the sales price in a sales device, such as a cash register, etc. For example, the retailer device 14 may change the sales price to the price obtained by adding a predetermined profit of the retailer to the changed purchase price, as a new sales price. Thereby, it becomes possible to instantly reflect the price strategy of the platform holder or the publisher on the sales price at the retailer.

Further, according to the sales system 100, sales situation data in which users who have bought the game disks and the retailers who have sold them are associated with each other can be accumulated. Thereby, information analysis for marketing activities, such as analysis of purchase behaviors in accordance with users' attributes, etc., can be supported. For example, a sales strategy of notifying users who frequently buy game disks from specific retailers of bargain sale information on the retailers, can be supported.

The present invention has been described above based on the preferred embodiments. The aforementioned embodiments have been described for exemplary purposes only, and are by no means intended to be interpreted restrictively. Rather, it can be readily understood by a person skilled in the art that various modifications may be made by making various combinations of the aforementioned components or processes, which are also encompassed in the scope of the present invention. Hereinafter, such variations will be described.

A first variation will be described. In the aforementioned embodiment, the money transfer support unit 38 executes the payment of the royalty to the platform holder and that of the purchase price to the publisher by making an account transfer request to the account transfer device 18. In the variation, the money transfer support unit 38 may execute processing for supporting the payments to the platform holder and the publisher, instead of directly executing the payment processing. For example, the money transfer support unit 38 may record in the account book file or the account database of the service provider that payments of the loyalty to the platform holder and that of the purchase price to the publisher should be made.

A second variation will be described. In the aforementioned embodiment, the sales management device 10 is installed in the service provider and the license management device 12 is in the platform holder; however, the present invention should not be limited to this embodiment. For example, when the publisher performs the distribution of the sales price and the management of the license, both the sales management device 10 and the license management device 12 may be installed in the publisher. In this case, the publisher will play the role of the service provider in the embodiment. As stated above, any one of the platform holder, the publisher, and the retailer may play the role of the service provider in the embodiment. In addition, it is not always necessary that the sales management device 10 and the license management device 12 have their casings physically separate from each other, but the respective functions may be achieved in the server in the same casing.

A third variation will be described. In the description with respect to FIG. 2 in the aforementioned embodiment, it is assumed that an optical disk, the game application of which has been recorded, is shipped from the platform holder to the publisher, however, the present invention should not be limited to this embodiment. For example, the platform holder may ship to the publisher an optical disk, the open ID and the secret ID of which have been set but the game application of which has not been set, i.e., a blank disk. Then, the optical disk may be sold to the retailer by wholesale after the game application has been recorded therein by the publisher.

Arbitrary combinations of the embodiments and the variations stated above are effective as the embodiments of the present invention. New embodiments created by the combinations have the respective advantages of the embodiments and the variations to be combined.

It is also understood by a person skilled in the art that the function to be fulfilled by each component described in the appended claims is achieved by each component described in the embodiments and the variations or by combinations of each components thereof.

INDUSTRIAL APPLICABILITY

This invention is applicable to a system for managing the sales of recording media on which digital contents are recorded.

The invention claimed is:

1. A sales system comprising:
a sales management device having a processor; and
a license management device,
wherein the sales management device includes a sales information communication unit configured to communicate, using the processor, when a non-transitory recording medium on which a digital content is recorded has been sold from a final seller to an end user at a store through a distribution channel of the recording media, to the license management device the sales information indicating that the recording medium has been sold at the store and a user ID and the license management device associates the user ID with a unique secret ID,
wherein the recording medium is encoded with an open ID and the unique secret ID, the secret ID not viewable by the end user; and
wherein, upon the end user placing the recording medium in a user device, the user device transmits the user ID, the open ID, and the secret ID to the license management device,
wherein the license management device includes a license provision unit configured to provide, on condition that the received user ID and the secret ID match the associated user ID and the secret ID, a license for enabling the use of the digital content contained on the tangible non-transitory recording medium on the user device of the end user, and
wherein the sales management device further includes a money transfer support unit configured to support transferring, using the processor, part of the sales price to an intermediate seller involving the distribution of the recording medium when the non-transitory recording medium has been sold to the end user.

2. The sales system according to claim 1, wherein the money transfer support unit executes payment of the purchase price of the recording media to the intermediate seller when the recording medium has been sold to the end user, by supporting transferring part of the sales price.

3. The sale system according to claim 2, wherein the sales management device further includes a price communication unit configured to communicate a situation of change in the purchase price to the final seller in order to change the sales price at the final seller in accordance with the situation of change in the purchase price.

4. The sale system according to claim 1, wherein the sales information includes information on the final seller who has sold the recording medium; and wherein the license management device further includes a sales situation recording unit configured to associate the information on the end user to whom the license has been provided, with the information on the final seller to store these information in a predetermined storage device.

5. A sales management method executed by a sales management device having a processor, the method comprising:
receiving, from an end user, a user ID and payment for a non-transitory recording medium on which a digital content is recorded,
wherein the recording medium is encoded with an open ID and a unique secret ID;
associating the user ID with the secret ID encoded on the recording medium in a database;
transferring, to an intermediate seller involving the distribution of the non-transitory recording medium when the recording medium has been sold to the end user, part of the sales price to when the non-transitory recording medium has been sold from a final seller to the end user through the distribution channel of the non-transitory recording medium, and
transmitting, by a user device, a user ID, the open ID, and the secret ID from the user device to the sales management device;
verifying that the received user ID is associated with the received secret ID in the database;

transmitting, by the sales management device, on condition that the received user ID is associated with the received secret ID match, a license to the user device for enabling use of the digital content on a user device of the end user.

\* \* \* \* \*